United States Patent [19]

Adams et al.

[11] 4,312,226

[45] Jan. 26, 1982

[54] COMPARATOR

[75] Inventors: Harold P. Adams, Norridge; Wesley L. Taylor, Glenview, both of Ill.; James B. Blanchard, Green Bay, Wis.

[73] Assignee: Mark Controls Corporation, Evanston, Ill.

[21] Appl. No.: 98,866

[22] Filed: Nov. 30, 1979

[51] Int. Cl.³ .................. G01K 3/08; G01L 13/02
[52] U.S. Cl. .................................. 73/336; 73/716
[58] Field of Search ............ 73/336, 716; 236/44 C; 235/200 R

[56] References Cited

U.S. PATENT DOCUMENTS

| | | | |
|---|---|---|---|
| 2,144,693 | 1/1939 | Seid | 236/44 |
| 2,177,596 | 10/1939 | Haines | 236/44 |
| 2,225,955 | 12/1940 | Haines | 236/44 |
| 2,258,021 | 10/1941 | Locke | 257/3 |
| 2,318,706 | 5/1943 | Newton | 257/3 |
| 2,343,467 | 3/1944 | McGrath | 257/3 |
| 2,372,839 | 4/1945 | McGrath | 257/3 |
| 3,913,344 | 10/1975 | Holloway | 236/44 |
| 4,182,180 | 1/1980 | Mott | 73/336 |

*Primary Examiner*—Donald O. Woodiel
*Attorney, Agent, or Firm*—Hume, Clement, Brinks, Willian & Olds, Ltd.

[57] ABSTRACT

A comparator for selecting from two air sources, air which requires less energy to condition includes a humidity and a temperature sections for comparing relative humidities and dry-bulb temperatures of air from each of the sources. Each section comprises two chambers separated from each other by a diaphram which is displaceable in the direction of the chamber having a lower pressure. A temperature post is attached to the diaphram of the temperature section and a humidity post is attached to the diaphram of the humidity section. The pressure in each of the chambers is determined by the pressure signal generated by a transmitter and it indicates the sensed condition. The post of the humidity section coacts with the post of the temperature section to give an output signal indicating which of the two air sources has a lower enthalpy except that when the humidity of the outside air is lower than that of the return air. In that instance, the temperature section alone determines the output signal.

The output signal is either high or low. When the temperature post closes off a nozzle having supply pressure therein the output signal is high. When on the other hand, the temperature post is not closing said nozzle the output signal is low. The output signal is used to select air from the two air sources.

8 Claims, 5 Drawing Figures

COMPARATOR

BACKGROUND OF THE INVENTION

This invention relates to devices for selecting from a plurality of air sources, air which would be most efficient to condition to a predetermined temperature. In particular, it relates to pneumatic devices which select air from two sources on the basis of humidity and temperature of air from each source.

In buildings which have a central air conditioning system, air is generally supplied to the air conditioning system from two sources, namely, from the outdoors and from the enclosed space being conditioned. The regulations and building codes in many localities require that a certain percentage (e.g. 20%) of air supplied to the enclosed space be outdoor air. The remaining air supplied to the enclosed space can be any proportion of the outdoor air and the return air from the enclosed space. To save energy, control systems have been designed, to choose either outdoor or return air depending on which air requires less energy to bring it to the desired temperature. Initially, such control systems operated solely on the basis of temperature of the outdoor and of the return air. For example, when the desired temperature in the enclosed space is 72° F., the outdoor air temperature is 73° F., and the return air temperature is 77° F., the control system selects practically all outdoor air and excludes the return air. It is known, however, that the amount of energy required to cool a given volume of air depends not only on its temperature but also on its moisture level.

Accordingly, humidity as well as temperature of the air from each source should be considered in selecting between outdoor air and return air. The air having a lower enthalpy should be chosen in all but one situation. When the outdoor air has an enthalpy lower than that of the return air but the temperature of the outdoor air is higher than that of the return air, it has been determined that the return air takes less energy to condition. Accordingly, an efficient control system should select the source of air for the air conditioning on the basis of the enthalpy and temperature. In the event the enthalpy of outdoor air is lower but its temperature is higher than that of the return air, the control system should choose the source having a lower temperature i.e. the return air. The present invention provides an improved control device (hereinafter referred to as "a comparator") for selecting of air from two sources of the basis of humidity and temperature of each of two air sources. When the selection is made on the basis of enthalpy, the comparator of the present invention does not generate enthalpy signals but rather generates a force which is indicative of the difference in relative humidity levels of air from each of the two sources and another force indicative of the difference in dry-bulb temperatures of air from each of the air sources and on the basis of these comparisons selects the air which has a lower enthalpy. When the selection is made on the basis of enthalpy, the humidity and the temperature comparison sections coact to give the ultimate selection signal. On the other hand, when the selection is made on the basis of temperature, the humidity comparing section does not coact with the temperature comparing section.

Thus, one object of the present invention is to provide an improved pneumatic comparator which provides a signal indicating which one of the two sources of air would require less energy for cooling it to a desired temperature.

Another object of the invention is to provide a comparator which produces, without generating intermediate pneumatic signals indicative of enthalpy of air from each source, a pneumatic output signal indicating which of two air sources requires less energy for conditioning it to a desired temperature.

Still another object of the invention is to provide an improved pneumatic comparator which, in response to pressure signals indicative of the dry-bulb temperature and the relative humidity of air from each of the two sources, generates a digital signal indicating which air source requires less energy for cooling to the desired temperature.

A further object of the present invention is to provide an improved pneumatic comparator which is simple and inexpensive to construct, install and maintain.

A still further object of the present invention is to provide an improved pneumatic comparator which is compact and reliable.

Still another object of the present invention is to provide an improved pneumatic comparator which can be easily and quickly modified to operate with either the two-pipe pneumatic transmitters or the single-pipe pneumatic transmitters or with both single-pipe and two-pipe transmitters.

A still further object of the present invention is to provide an improved pneumatic comparator which includes a section for generating a force indicative of the difference in dry-bulb temperatures and a section for generating a force indicative of the difference in humidities of each of the two air sources. The two sections can either coact or can function independently of each other. When the two sections coact the output signal indicates which of the two air sources has a greater enthalpy. On the other hand, when the two sections do not coact, the output signal indicates which of the two air sources has a higher temperature. Accordingly, the same temperature section is used in both modes of operation.

Other objects of the present invention will become apparent to those skilled in the art upon studying this disclosure.

BRIEF DESCRIPTION OF THE INVENTION

The improved comparator of the present invention includes a humidity section for generating a first force indicative of the difference in relative humidity of air from two sources and a temperature section for generating a second force indicative of the difference in dry-bulb temperatures of air from the same two sources. The humidity section includes a first chamber for receiving a pressure signal indicative of the relative humidity of the outdoor air and, a second chamber for receiving a pressure signal indicative of the relative humidity of the return air. A first balancing diaphram separating the two chambers has a humidity post sealingly secured to and extending through said diaphram. The position of the humidity post is determined by the difference in pressures between the first chamber and the second chamber. The temperature section includes a third chamber for receiving a pressure signal indicative of the dry-bulb temperature of the outdoor air and the fourth chamber for receiving a pressure signal indicative of the dry-bulb temperature of the return air. A second balancing diaphram which separates the third chamber from the fourth chamber has a temperature post extending therethrough and sealingly attached thereto. One end of the temperature post extends toward a nozzle which communicates with the output chamber that is constantly supplied with pressurized air.

The first force generated by the humidity section indicative of the difference between relative humidities of air in the two air sources and the second force indicative of difference in the dry-bulb temperatures of air in the two air sources are effectively compared by means of the temperature and the humidity posts. The relative areas of the first diaphram and the second diaphram are chosen such that whenever the temperature and the humidity posts are in contact the resultant displacement of the temperature post indicates which air source has a higher enthalpy by opening or closing a nozzle of a chamber pressurized through a restricted opening. When, on the other hand, the two posts are not in contact the resultant displacement of the temperature post is due solely to the difference in pressures in the third and the fourth chambers and indicates which air source has a higher temperature by opening or closing a nozzle of a chamber pressurized through a restricted opening.

DETAILED DESCRIPTION OF THE INVENTION

The present invention provides a pneumatic comparator which in response to pressure signals indicative of the relative humidity and dry-bulb temperature of air from each of two air sources generates a first force indicative of the difference between relative humidities of the two air sources and a second force indicative of the difference between temperatures of the two air sources. It then makes use of the first force and the second force to produce a digital output signal indicating which air source should be utilized for most efficient conditioning thereof. The comparator provides a pressure signal indicating the selection of air from the source having the lower enthalpy except in one instance. Namely, when the outdoor air has a lower enthalpy than the return air, the air having the lower temperature is selected. The reason for the exception is that it has been determined that in this instance the air temperature is a better indicator of which air will require less energy for cooling it to a predetermined value. It shall be noted that the comparator of the present invention utilizes the same temperature comparing section when it operates in the enthalpy-selecting mode or when it operates in the temperature-controlled mode. It should also be noted that the comparator of the present invention compares a difference in dry-bulb temperatures and a difference in relative humidities of air from the two air sources to select a source having a lower enthalpy. Accordingly, the comparator of the present invention eliminates the steps of generating pressure signals indicative of enthalpy of air from each of the air sources and the step of generating a pressure signal proportional to the difference between the enthalpy of the outdoor air and the enthalpy of the return air.

The invention will be described herein in connection with a system for selecting air from two sources for cooling it to a temperature desired in an enclosed space. It should be understood that the pneumatic comparator of the present invention can be used for other systems and that the system in the drawings is provided merely for illustrative purposes and to assist in explaining the construction of the operation of the comparator made in accordance with the present invention.

Figure 1:
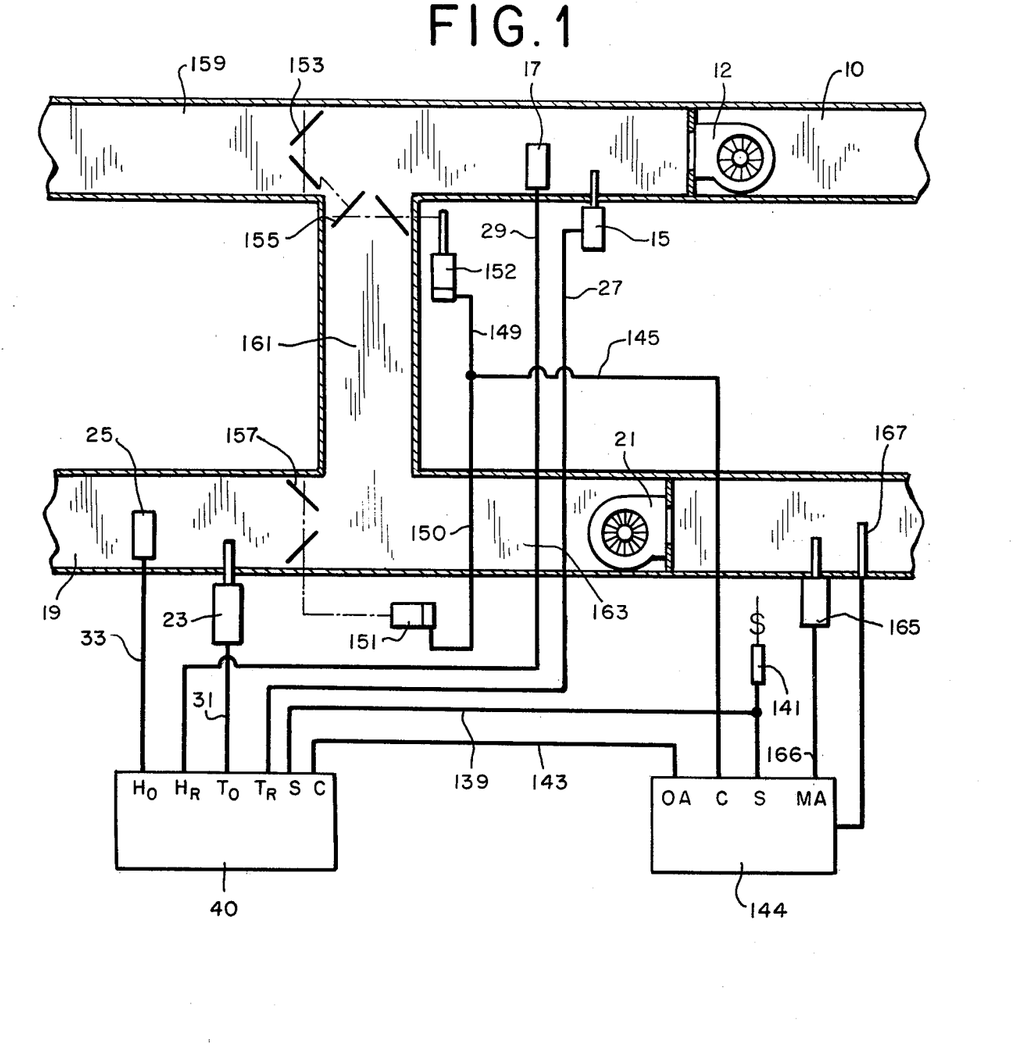
FIG. 1 depicts a control system for selecting from two sources air for an enclosed space, which system includes a pneumatic comparator constructed in accordance with the present invention.

Referring now to FIG. 1, there is shown a control system for selecting air from two sources: the return air duct and the outdoor air duct. The return air is drawn from an enclosed space (not shown) into a return air duct 10 by return-air fan 12. The temperature of the air drawn into the duct 10 is sensed by a pneumatic dry-bulb temperature transmitter 15 which generates a pressure signal indicative of the sensed temperature. Any pneumatic temperature transmitter can be used in connection with this system including both two-pipe and single-pipe transmitters. The transmitter used in the system depicted in the FIGURES is model 184-0018 single-pipe pneumatic transmitter made by MCC Powers Company, 3400 Oakton Street, Skokie, Illinois (hereinafter referred to as "MCC Powers"). The construction and the operation of the transmitter is described in MCC Powers' technical bulletin TT184-1 which is incorporated herein by reference.

The humidity of the air drawn into the duct 10 is sensed by a pneumatic relative-humidity transmitter 17 which generates a pressure signal indicative of the sensed relative humidity. Any pneumatic humidity transmitter can be used with this system including both two-pipe and single-pipe transmitters. The transmitter used in the system depicted in the FIGURES is model 186-0051 single-pipe transmitter made by MCC Powers. The construction and the operation of the transmitter is described in MCC Powers' technical bulletin HT-186-1 which is incorporated by reference.

The outdoor air is drawn into the outdoor-air duct 19 by an outdoor air fan 21. The temperature of the outdoor air drawn into the duct 19 is sensed by a pneumatic temperature transmitter 23 which generates a pressure signal indicative of the sensed temperature. The transmitter 23 can be any pneumatic transmitter that can be used as transmitter 15. In the system depicted in the FIGURES, the temperature transmitter 23 is MCC Powers' model 184-0018 single-pipe pneumatic transmitter.

The relative humidity of the air drawn into the duct 19 is sensed by the relative-humidity pneumatic transmitter 25, which generates a pressure signal indicative of sensed relative humidity. Again, the transmitter 25 can be any transmitter that can be used as transmitter 17. In the system depicted in the FIGURES, MCC Powers' Model 186-0051 relative humidity single-pipe transmitter is used. The pressure signals generated by each of the transmitters 15, 17, 23 and 25 are passed through air lines 27, 29, 31 and 33, respectively, to a comparator 40 which is shown in detail in FIGURES 2-5.

Figure 2:
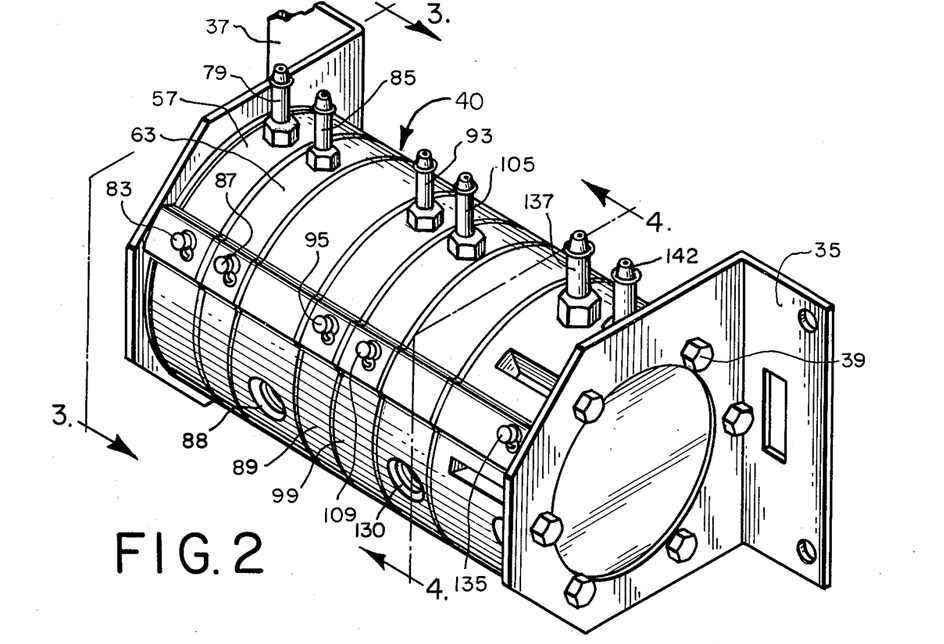
FIG. 2 is a perspective view of the pneumatic comparator constructed in accordance with the present invention.
Figure 3:
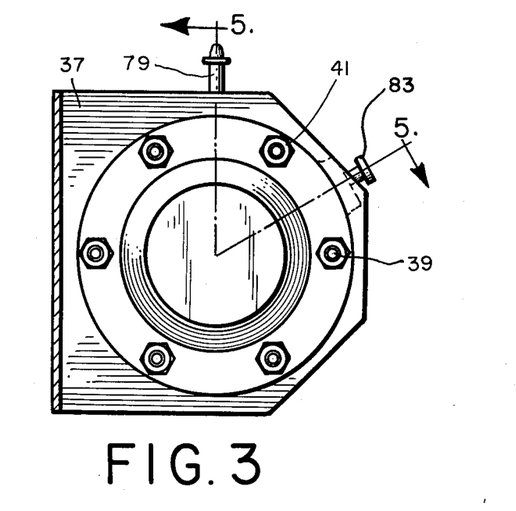
FIG. 3 is a partial cross-sectional view of the comparator shown in FIG. 2 taken along line 3—3 thereof.
Figure 4:
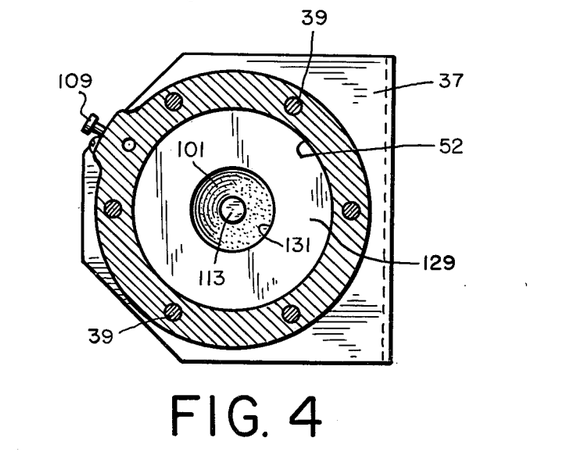
FIG. 4 is a cross-sectional view of the comparator shown in FIG. 2 taken along line 4—4 thereof.
Figure 5:
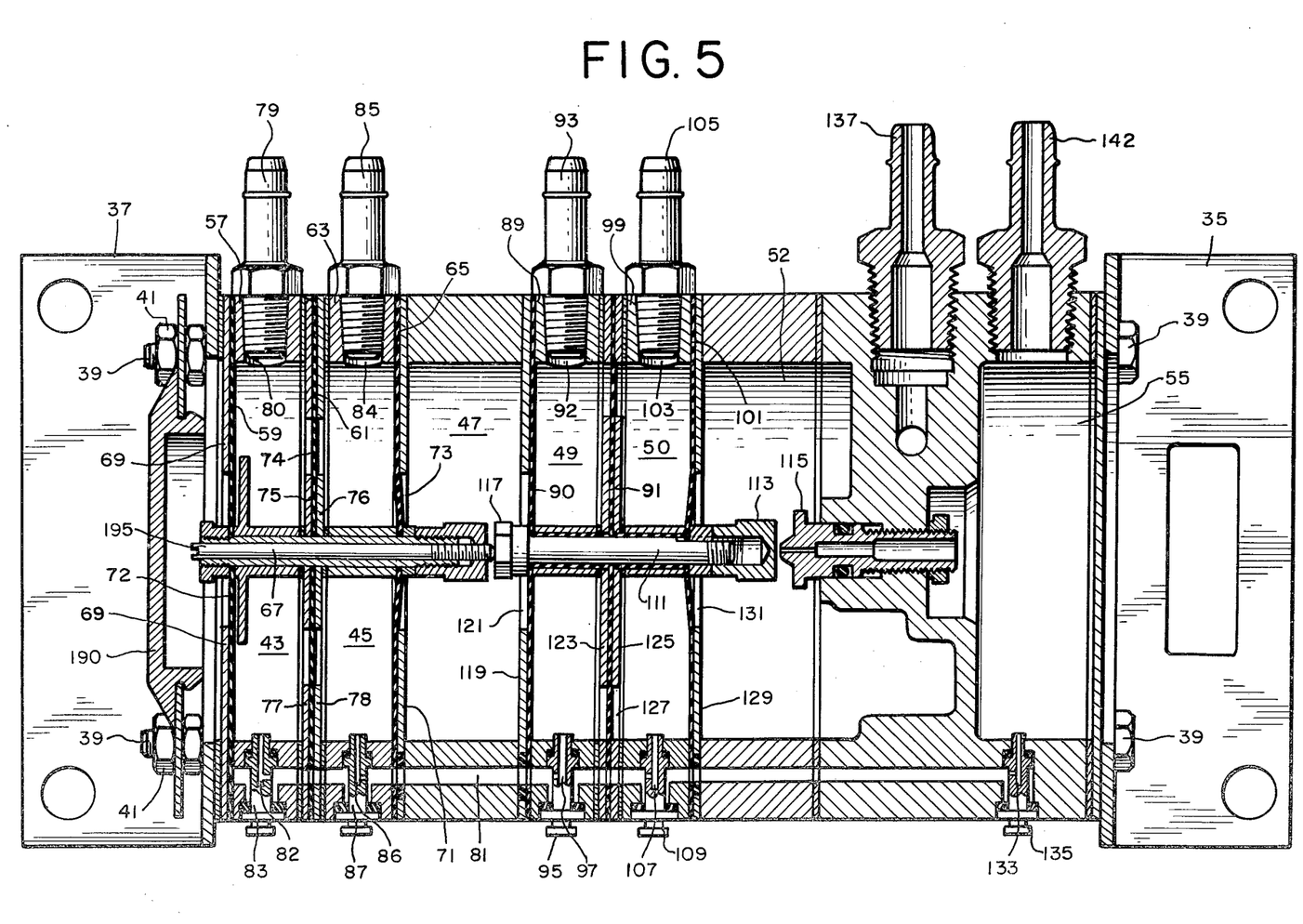
FIG. 5 is a cross-sectional view of the comparator taken along line 5—5 of FIG. 3.

Referring now to FIG. 2, the comparator 40 can be secured to a mounting surface (not shown) by mounting brackets 35 and 37 which are attached to the comparator 40 by bolts 39 and nuts 41. (See also FIGS. 3 and 5). As shown in FIGS. 2 and 5, the comparator 40 is cylindrical in shape and it is subdivided into a plurality of separate cylindrical chambers 43, 45, 47, 49, 50, 52 and 55.

The chamber 43 is defined by a stationary lateral wall 57, a sealing diaphram 59 and a balancing diaphram 61. Similarly, the chamber 45 is defined by a stationary lateral wall 63, a sealing diaphram 65 and the balancing diaphram 61 which is common to chambers 43 and 45. A humidity post 67 extends through the centers of diaphrams 59, 61 and 65 is sealingly secured to said diaphrams. The balancing diaphram 61 is intended to provide a force acting onto the humidity post 67 toward either the chamber 43 or the chamber 45 whichever chamber has a lower pressure. The sealing diaphrams 59 and 65, on the other hand, are merely to provide a non-rigid seal for the humidity post 67. In order to minimize the effects of the sealing diaphrams 59 and 65 on the resultant force exerted by the balancing diaphram 61 on the humidity post 67 annular plates 69 and 71 are placed in contact with the diaphrams 59 and 65, respectively. The plates 69 and 71 limit the effective areas of the diaphrams 59 and 65 to the areas which are not in contact with plates 69 and 71, i.e. areas 72 and 73. The effective area 74 defined by post plates 75 and 76 and reducer plates 77 and 78 in contact with the balancing diaphram 61 is larger than the effective areas 72 and 73. For example, in a comparator 40 shown in the FIGURES, the effective areas of the sealing diaphrams 59 and 65 are 0.1511 square inches each, whereas the effective area of the balancing diaphram 61 is 0.5849 square inches. Furthermore, the forces exerted by diaphrams 59 and 65 onto the humidity post 67 tend to cancel each other. Accordingly, the resultant force exerted on the humidity post 67 is for all practical purposes the force of balancing diaphram 61 indicative of the pressure differential between the pressure in the chamber 43 and the pressure in the chamber 45. The pressure in chamber 43 is determined by the pressure of the pressure signal generated by the relative-humidity transmitter 25 and transmitted via line 33 attached to a barb 79 and through a port 80 in the lateral wall 57.

It should be noted that the comparator 40 depicted in FIG. 5 is designed to operate with single-pipe transmitters; therefore, pressurized supply air is being supplied into the chamber 43 via a manifold 81 and a restricted passageway 82 in the removable plug 83. In the single-pipe system the transmitter basically controls the pressure in the chamber 43 by controlling the rate of discharge of pressurized air supplied to chamber 43 and exhausted via line 33. For example, whenever the sensed temperature calls for a pressure signal of an increased magnitude, the transmitter restricts the rate of flow of air through line 33 which generates a pressure build-up which is rapidly transmitted to the chamber 43. It should be noted that the comparator 40 can be used with two-pipe transmitters when the removable plug 83 is replaced by a blank plug (not shown) which blocks the communication between the manifold 81 and the chamber 43. In a two-pipe system pressurized air is provided through one pipe and discharged through the other. The two-pipe transmitter creates a pressure signal by controlling the discharge of air through the second pipe. The pressure signal of the two-pipe transmitter is transmitted via line 33 to chamber 43 when it is operating with a two-pipe transmitter (not shown).

It should be noted that the easy adaptability of the comparator 40 for operation with two-pipe or single-pipe transmitters provides an important advantage when the comparator 40 is installed in existing systems which already have transmitters and when transmitters connected to the comparator 40 need to be replaced by a different type transmitters. It should also be noted that the comparator 40 can operate in a system which includes a combination of two-pipe transmitters and single-pipe transmitters. In such system, chambers connected to single-pipe transmitters would have restricted plugs such as the plug 83 and the chambers connected to the two-pipe transmitters would have blank plugs.

The pressure in the chamber 45 is determined by the humidity transmitter 17 which controls the rate of flow of air from the line 29 communicating with the chamber 45 via port 84 and is attached to a barb 85. The chamber 45 is constantly supplied with pressurized air from the manifold 81 via restriction 86 in a removable plug 87. The chamber 47 is included merely to provide space between the humidity section (chambers 43 and 45) and the temperature section (chambers 49 and 50). As shown in FIG. 2, the chamber 47 is vented to the atmosphere through a circular opening 88.

The chambers 49 and 50 are constructed and operate in the same manner as chambers 43 and 45. The chamber 49 is defined by a lateral wall 89, a sealing diaphram 90 and a balancing diaphram 91. The lateral wall 89 has a port 92 which provides communication between the chamber 49 and air line 31 which is connected to the comparator 40 by a barb 93. A removable plug 95 provides through a restricted passageway 97 a communication between the manifold 81 and the chamber 49. The pressure in the chamber 49 is determined by the temperature transmitter 23 which controls the rate of discharge through line 31 which communicates with the chamber 49. Similarly, the chamber 50 is defined by a lateral wall 99, the diaphram 91 and a sealing diaphram 101. The chamber 50 communicates with the air line 27 via port 103 in the lateral wall 99. The air line 27 is connected to the comparator 40 by a barb 105. The pressurized air is supplied through a restricted passageway 107 in a removable plug 109, which passageway communicates with the manifold 81. A temperature post 111 extends through the centers of the diaphrams 90, 91 and 101, and is sealingly secured to said diaphrams. The post 111 has a nozzle end 113 which extends toward a nozzle 115 and a contact end 117 which extends toward the humidity post 67. An annular plate 119 restricts the effective area of the sealing diaphram 90 to the area designated by a numeral 121. Similarly the effective area of the balancing diaphram 91 is restricted by post plates 123 and 125 to that designated by a numeral 127 and the effective area of the diaphram 101 is restricted by a plate 129 to that designated by a numeral 131. The effective areas of the sealing diaphrams 90 and 101 are small in comparison with the effective area of the balancing diaphram 91. For example, in the comparator shown in the FIGURES, the effective area of each sealing diaphrams 90 and 101 is 0.1511 square inches; whereas, the effective area of the balancing diaphram 91 is 1.5951 square inches. Furthermore, the forces on each of the sealing diaphrams 90 and 101 are in opposite directions and therefore they tend to cancel each other. Accordingly, for all practical purposes the position of the post 111 is determined by the force exerted thereon by the balancing diaphram 91 and the force (if any) exerted thereon by the humidity post 67.

The effective areas of the balancing diaphram 61 of the humidity section and the balancing diaphram 91 of the temperature section are such that the resultant force approximates the difference between the enthalpy of outdoor air and that of the return air. The relative effective areas of the humidity and temperature balancing diaphrams have been empirically established.

The nozzle 115 provides a communication between a chamber 52 vented to the atmosphere through a circular opening 130 and the output chamber 55. The chamber 52 is intended merely to provide space necessary to accomodate the nozzle end 113, the nozzle 115 and to permit deflection of the diaphram 101.

The output chamber 55 is continuously supplied via a restricted passageway 133 in a removable plug 135 with a pressurized supply air from the manifold 81. The manifold 81 communicates via a barb 137 and air line 139 with an air supply source 141. The pressure in the output chamber 55 is either high (i.e. equal to the supply pressure) or low (i.e. equal to 0 pressure) depending on whether the nozzle 115 is closed or open. The pressure from the output chamber 55 is transmitted via a line 143 secured on a barb 142 to a mixed air controller 144.

When the pressure signal being transmitted to the mixed air controller 144 is low (i.e, equal to 0 pressure), the mixed air controller 144 controls the proportion of air flowing from the outdoor air duct 19 and from the return air duct 10 as follows. As shown in FIG. 1, the mixed air controller 144 sends a pressure signal via lines 145, 149 and 150 to damper motors 151 and 152 which control the position of dampers 153, 155 and 157 restricting the flow of air into an exhaust duct 159, a recycle duct 161 and inflow duct 163, respectively. The position of the dampers is determined, depending on the pressure signal from the set-point temperature transmitter 165 transmitted to the mixed air controller 144 via line 166. Whenever the set-point temperature is between the outdoor air temperature and the return air temperature, the mixed air controller 144 selects such proportion of the return and outdoor air as to provide mixed air having the set point temperature of the temperature transmitter 165 or mixed air having temperature as close as possible to the set point temperature.

When the pressure signal transmitted by the comparator 40 to the mixed air controller 144 is high (i.e. equal to supply pressure), the mixed air controller transmits a pressure signal to damper motors 151 and 152 calling for a minimum permissible flow of outdoor air. The mixed air controller 144 used in the system depicted in FIG. 1 is MCC Powers 189-0005. Its construction and operation is described in MCC Powers RC-189-1 which is incorporated herein by reference. The damper motors 151 and 152 shown in FIG. 1 are MCC Powers series 331 motors. The construction and the operation of these motors is described in MCC Powers Technical Instruction PM 331-6 which is incorporated herein by reference.

The pneumatic signal generated by the comparator 40 is 0 when the return-air enthalpy is greater than the outdoor-air enthalpy and the temperature of the return air is greater than the temperature of the outdoor air. At all other conditions the pressure signal generated by the comparator 40 is the supply air pressure.

The logic of the comparator can be summarized as follows:

| CONDITIONS | | OUTPUT PRESSURE |
|---|---|---|
| h (enthalpy) | T (temperature) | (psig) |
| $h_R > h_o$ | $T_R > T_o$ | ZERO PRESSURE |
| $h_R > h_o$ | $T_R > T_o$ | SUPPLY PRESSURE |
| $h_R > h_o$ | $T_R > T_o$ | SUPPLY PRESSURE |
| $h_R > h_o$ | $T_R > T_o$ | SUPPLY PRESSURE | where:
$h_R$ = return air enthalpy
$h_o$ = outdoor air enthalpy
$T_R$ = return air temperature
$T_o$ = outdoor air temperature In operation, the fan 12 draws air from the enclosed space (not shown) into the return duct 10 and forces it along said duct 10. The temperature transmitter 15 senses the dry-bulb temperature of the air in the duct 10 and generates in response to the sensed temperature a pressure signal indicative of the sensed temperature. The pressure signal generated by the temperature transmitter 15 is transmitted via line 27 into the chamber 50. The humidity transmitter 17 senses the relative humidity of the air in the duct 10 and generates in response thereto a pressure signal indicative of the sensed relative humidity. The pressure signal generated by the humidity transmitter 17 is passed via lines 29 to the chamber 45.

At the same time the dry-bulb temperature of the outdoor air drawn into the duct 19 by the fan 21 is sensed by the transmitter 23 which generates in response to the sensed temperature a pressure signal indicative of said temperature. The relative humidity of the outdoor air drawn into the duct 19 is sensed by the transmitter 25 which generates in response to the sensed humidity a pressure signal indicative of the sensed relative humidity. The signal generated by the transmitter 23 is transmitted via line 31 into the chamber 49 and the signal generated by the transmitter 25 via line 33 into the chamber 43.

The pressure in the chamber 43 is balanced against the pressure in the chamber 45. The resultant pressure exerts force on the humidity post 67. Whenever the humidity of the outdoor air is greater than the humidity of the return air, the pressure in the chamber 43 is greater than that of the chamber 45. Accordingly, the balancing diaphram 61 exerts on the humidity post 67 a force which is directed toward the chamber 45 and is proportional in magnitude to the difference between the pressures in the two chambers 43 and 45. Of course, the direction of the force on the humidity post 67 is reversed when the humidity of the outdoor air is less than that of the return air.

Similarly, the pressure in the chamber 49 is balanced against the pressure in the chamber 50. The resultant pressure exerts a force on the temperature post 111. Whenever the temperature of the outdoor air is greater than that of the return air, the pressure in the chamber 49 is higher than that in the chamber 50 and the resultant force exerted by the diaphram 91 is proportional to the difference between the pressures in chamber 49 and 50 and directed toward the chamber 50. Again, the direction of the force onto the temperature post 111 is reversed when the temperature of the return air is higher than that of the outdoor air.

Whenever the enthalpy of the return air is higher than that of the outdoor air and the temperature of the return air is greater than that of the outdoor air, the resultant force acting on the temperature post 111 keeps the end 113 away from the nozzle 115. The pressure in the output chamber 55 is then 0 psig. At the remaining conditions, the resultant force acting on the temperature post maintains the end 113 closely against the nozzle 115 so that the pressure in the output chamber is substantially equal to the supply pressure. It should be noted that the position of the post 67 with respect to the post 111 can be easily adjusted when the comparator 40 is installed by removing a cover 190 and moving the threaded rod 195.

EXAMPLE

The following specifications summarize the details of performance of MCC Powers' RL 243 EC Enthalapy Comparator which was constructed in accordance with the present invention:

| Inputs: | |
|---|---|
| Four 3 to 15 psig (21 to 103 kPa) pneumatic signals, | |
| Line 27 | Outdoor Temperature 50 to 100° (10 to 38° C. Transmitter Range |
| Line 31 | Return air temperature 50 to 100° F. (10 to 38° C.) Transmitter Range |
| Line 33 | Outdoor air humidity 20 to 80% RH Transmitter Range |
| Line 29 | Return air humidity 20 to 80% RH Transmitter Range |
| Output: | |
| Line 143 | Zero or Supply pressure (two position) |
| Output Air Capacity: | 40 scim (11 cm3/s) at 22 psig (15skPa) |
| Air Consumption | 180 scim (49 cm3/s) with four transmitters 40 scim 11 cm3s) without transmitters |
| Air Supply: Line 139 | |
| Operating pressure | 22 ± 1 psi (152 ± 7kPa) |
| Maximum safe pressure | 30 psig (207kPa) |
| Operating Ambient Temperature Range | 40 to 120° F. (4 to 9° C.) |
| Enthalpy range | 20 to 36 BTU/lb. (46.5 to 83.6 kJ/kg) |
| Mounting: Surface | |
| Air Connections | Barb fitting ¼" (6.4 mm) O.D. plastic tubing |

The above example is provided for the purpose of illustrating the invention and it is not intended to limit the claimed invention in any manner.

Many changes and modifications of the present invention will become apparent to those skilled in the art upon studying this disclosure. All changes and modifications that fall within the spirit of the invention as defined by the claims are intended to be included within its scope.

I claim:

1. A comparator for indicating which of two air sources is more efficient to condition to a predetermined temperature, said comparator comprising:

first means for comparing a first input signal indicative of the relative humidity of air from a first source and a second input signal indicative of the relative humidity of air from a second source and for generating in response thereto a first force indicative of the difference between said first input signal and said second input signal;

second means for comparing a third input signal indicative of the dry-bulb temperature of air from the first source and a fourth input signal indicative of the dry-bulb temperature of air from the second source and for generating a second force indicative of the difference between said third input signal and said fourth input signal;

means for adding said first force and said second force to produce a combined force indicating which of said first and said second source has higher enthalpy whenever the humidity of air from said first source is higher than that of air from said second source and for disengaging said first comparing and generating means from said second comparing and generating means whenever the humidity of air from said first source is lower than that of air from said second source; and output means for receiving said combined force or said second force and for producing in response thereto an output signal indicating which of said first and said second air sources is more efficient to condition.

2. A comparator as claimed in claim 1, wherein said first input signal, said second input signal, said third input signal, said fourth input signal and said output signal are pneumatic signals.

3. The comparator of claim 2 wherein:

air from said first source is return air in an air conditioning system;

air from said second source is outdoor air.

4. The comparator of claim 2 wherein said output signal is digital.

5. A comparator for generating a pneumatic output signal indicating which of two air sources is more efficient to condition to a predetermined temperature, said comparator comprising :

a first chamber for receiving a first pneumatic input signal indicative of the relative humidity of the air from a first source and a second chamber for receiving a second pneumatic input signal indicative of the relative humidity of the air from a second source, said first chamber and said second chamber being separated from each other by a first diaphram;

a third chamber for receiving a third pneumatic input signal indicative of the dry-bulb temperature of air from the first source, and a fourth chamber for receiving a fourth pneumatic input signal indicative of the dry-bulb temperature of air from the second source, said third chamber and said fourth chamber being separated from each other by a second diaphram;

a humidity post operatively connected to said first diaphram;

a temperature post operatively connected to said second diaphram;

an output chamber for receiving through a restricted opening pressurized air; and a nozzle for discharging air from said output chamber, said temperature post closing said nozzle due to the first force exerted by said first diaphram onto said humidity post and transmitted to said temperature post and the second force exerted by said second diaphram onto said temperature post whenever the enthalpy of air from the first source is higher than that of the second source and closing said nozzle due to the second force alone whenever the enthalpy of air from the first source is lower than the enthalpy of air from the second source but the dry-bulb temperature of the air from the first source is higher than the dry-bulb temperature of the air from the second source, closing of said nozzle generating said output signal indicating said second air source being more efficient to condition, opening of said nozzle generating said output signal indicating said first air source being more efficient to condition.

6. A pneumatic comparator for generating in response to pneumatic signals indicative of dry-bulb temperature and relative humidity of outdoor and return air a digital signal indicating whether the outdoor air or the return air is more efficient to condition to a predetermined temperature, said pneumatic comparator comprising:

a first chamber having a first port for receiving a pneumatic pressure signal indicative of the relative humidity of the outdoor air;

a second chamber having a second port for receiving a pneumatic pressure signal indicative of the relative humidity of the return air;

a first common diaphragm separating said first chamber from said second chamber;

a humidity post extending through said first diaphragm and sealingly secured thereto;

a third chamber having a third port for receiving pneumatic pressure signal indicative of dry-bulb temperature of outdoor air;

a fourth chamber having a fourth port for receiving pneumatic pressure signal indicative of dry-bulb temperature of return air;

a second command diaphragm separating said third chamber from said fourth chamber;

a temperature post extending through said second diaphragm sealingly secured thereto;

an outlet chamber having a restricted port for receiving supply air pressure and an outlet port for transmitting the output pressure to form said digital signal;

a nozzle for venting the output chamber, said temperature post closing, due to the force exerted thereon by first diaphragm and said humidity post, the nozzle to produce a high output pressure when the enthalpy of outdoor air is greater than the enthalpy of the return air, the temperature post, acting independently of the humidity post, also closing said nozzle when the dry-bulb temperature of outdoor air is greater than the dry-bulb temperature of the return air.

7. A pneumatic comparator as claimed in claim 6 further comprising a first restricted opening in said first chamber, a second restricted opening in said second chamber, a third restricted opening in said third chamber, a fourth restricted opening in said fourth chamber, said first, second, third and fourth restricted openings being for receiving of supply pressure and said first, second, third and fourth ports being for receiving pneumatic pressure signal from the respective single-pipe transmitters.

8. A pneumatic comparator as claimed in claim 6 wherein said first, second, third and fourth ports are for receiving pneumatic pressure signals from the respective two-pipe transmitters.

* * * * *

UNITED STATES PATENT AND TRADEMARK OFFICE
CERTIFICATE OF CORRECTION

PATENT NO. : 4,312,226

DATED : Jan. 26, 1982

INVENTOR(S) : Harold Adams, Wesley Taylor, James Blanchard

It is certified that error appears in the above—identified patent and that said Letters Patent is hereby corrected as shown below:

In column 8 in the chart of CONDITIONS and OUTPUT PRESSURE under the heading "enthalpy" the second written line down, after "hR", delete ">" and insert --<-- therefor, and in the third line down, after "hR", delete ">" and insert therefor --<--; under the heading "temperature" in the third line, after "Tr", delete ">" and insert --<-- therefor and in the fourth and final written line of the chart, after "Tr", delete ">" and insert --<-- therefor.

Signed and Sealed this

Seventeenth Day of January 1984

[SEAL]

Attest:

GERALD J. MOSSINGHOFF

Attesting Officer

Commissioner of Patents and Trademarks